United States Patent [19]

Broderick et al.

[11] Patent Number: 5,154,939
[45] Date of Patent: Oct. 13, 1992

[54] USE OF SALT TO IMPROVE EXTRUSION ENCAPSULATION OF CHEWING GUM INGREDIENTS

[75] Inventors: Kevin B. Broderick, Berwyn; Charles M. Copper, Westmont; Joo H. Song, Northbrook, all of Ill.

[73] Assignee: Wm. Wrigley Jr. Company, Chicago, Ill.

[21] Appl. No.: 789,354

[22] Filed: Nov. 8, 1991

Related U.S. Application Data

[63] Continuation-in-part of Ser. No. 781,006, Oct. 18, 1991, which is a continuation-in-part of Ser. No. 606,044, Oct. 30, 1990, which is a continuation-in-part of Ser. No. 340,384, Apr. 19, 1989, Pat. No. 4,978,537.

[51] Int. Cl.$^5$ .............................................. A23G 3/30
[52] U.S. Cl. ...................................... 426/5; 426/96; 426/548; 426/804; 426/516
[58] Field of Search ................ 426/96, 548, 804, 3–6, 426/454, 658, 516

[56] References Cited

U.S. PATENT DOCUMENTS

| | | | |
|---|---|---|---|
| 2,224,430 | 12/1940 | Garbutt | 107/8 |
| 3,028,308 | 4/1962 | Zambito et al. | 167/82 |
| 3,201,353 | 8/1965 | Corben | 252/316 |
| 3,329,574 | 7/1967 | Barron et al. | 167/82 |
| 3,435,110 | 3/1969 | Nichols | 424/20 |
| 3,737,521 | 6/1973 | Born | 424/22 |
| 3,795,744 | 3/1974 | Ogawa et al. | 426/3 |
| 3,818,107 | 6/1974 | Yolles | 426/3 |
| 3,923,939 | 12/1975 | Baker et al. | 264/49 |
| 3,928,633 | 12/1975 | Schoat et al. | 426/96 |
| 3,951,821 | 4/1976 | Davidson | 252/1 |
| 4,122,195 | 10/1978 | Bahosky et al. | 426/3 |
| 4,125,519 | 11/1978 | Goodman et al. | 528/363 |
| 4,139,639 | 2/1979 | Bahoshy et al. | 426/3 |
| 4,206,301 | 6/1980 | Yolles | 536/3 |
| 4,226,886 | 10/1980 | Lakes | 428/304 |
| 4,230,687 | 10/1980 | Sair et al. | 424/22 |
| 4,374,858 | 2/1983 | Glass et al. | 426/5 |
| 4,384,004 | 5/1983 | Cea et al. | 426/3 |
| 4,384,005 | 5/1983 | McSweeney | 426/250 |
| 4,386,106 | 5/1983 | Merritt et al. | 426/5 |
| 4,388,328 | 6/1983 | Glass | 426/3 |
| 4,447,475 | 5/1984 | Lubbock et al. | 427/213.31 |
| 4,485,118 | 11/1984 | Carroll et al. | 426/5 |
| 4,490,395 | 12/1984 | Cherukuri et al. | 426/3 |
| 4,496,592 | 1/1985 | Kuwahara et al. | 426/5 |
| 4,515,769 | 5/1985 | Merritt et al. | 424/49 |
| 4,556,566 | 12/1985 | Bell | 426/96 |
| 4,556,567 | 12/1985 | Meyer | 426/96 |
| 4,568,560 | 2/1986 | Schobel | 427/3 |
| 4,590,075 | 5/1986 | Wei et al. | 426/5 |
| 4,606,940 | 8/1986 | Frank et al. | 427/213.32 |
| 4,634,593 | 1/1987 | Stroz et al. | 426/5 |
| 4,673,565 | 6/1987 | DiLuccio et al. | 424/443 |
| 4,673,577 | 6/1987 | Patel | 426/5 |
| 4,689,235 | 8/1987 | Barnes et al. | 426/89 |
| 4,690,825 | 9/1987 | Won | 424/501 |
| 4,695,463 | 9/1987 | Yang et al. | 424/440 |
| 4,711,784 | 12/1987 | Yang | 426/5 |
| 4,720,384 | 1/1988 | DiLuccio et al. | 424/78 |
| 4,722,845 | 2/1988 | Cherukuri et al. | 426/5 |
| 4,726,953 | 2/1988 | Carroll et al. | 426/5 |
| 4,740,376 | 4/1988 | Yang | 426/5 |
| 4,752,485 | 6/1988 | Sharma et al. | 426/99 |
| 4,766,036 | 8/1988 | Vaughn et al. | 428/364 |
| 4,771,784 | 12/1987 | Yang | 426/5 |
| 4,816,265 | 3/1989 | Cherukuri et al. | 426/5 |
| 4,824,681 | 4/1989 | Schobel et al. | 426/5 |
| 4,828,857 | 5/1989 | Sharma et al. | 426/285 |
| 4,841,968 | 6/1989 | Dunn et al. | 128/335.5 |
| 4,873,085 | 10/1989 | Fuisz | 424/400 |
| 4,885,175 | 12/1989 | Zibell | 426/5 |
| 4,892,736 | 1/1990 | Goodson | 424/435 |
| 4,911,934 | 3/1990 | Yang et al. | 426/5 |
| 4,929,447 | 5/1990 | Yang | 424/440 |
| 4,931,293 | 6/1990 | Cherukuri et al. | 426/5 |
| 4,933,190 | 6/1990 | Cherukuri et al. | 426/5 |
| 4,959,226 | 9/1990 | Chadelaine et al. | 426/3 |
| 4,978,537 | 12/1990 | Song | 426/5 |
| 4,992,280 | 2/1991 | Chu et al. | 426/5 |
| 5,000,965 | 3/1991 | Killeen et al. | 426/5 |

FOREIGN PATENT DOCUMENTS

| | | |
|---|---|---|
| 2005362 | 6/1990 | Canada . |
| 0040048 | 11/1981 | European Pat. Off. . |
| 0191986 | 8/1986 | European Pat. Off. . |
| 0252374 | 1/1988 | European Pat. Off. . |
| 0253554 | 1/1988 | European Pat. Off. . |
| 0220103 | 2/1988 | European Pat. Off. . |
| 0263224 | 4/1988 | European Pat. Off. . |
| 0273009 | 6/1988 | European Pat. Off. . |
| 0288909 | 11/1988 | European Pat. Off. . |
| 0370296 | 5/1990 | European Pat. Off. . |
| 0376549 | 7/1990 | European Pat. Off. . |
| 2503989 | 10/1982 | France . |
| WO85/03414 | 8/1985 | PCT Int'l Appl. . |
| WO88/09298 | 11/1988 | PCT Int'l Appl. . |
| WO89/02703 | 4/1989 | PCT Int'l Appl. . |
| 90/07864 | 7/1990 | PCT Int'l Appl. . |
| 90/12511 | 11/1990 | PCT Int'l Appl. . |
| 1327761 | 8/1973 | United Kingdom . |
| 9107103 | 5/1991 | World Int. Prop. O. ............. 426/5 |

OTHER PUBLICATIONS

F. Billmeyer, Jr., *Textbook of Polymer Science*, 518–22 (Wiley International Edition, 2nd).

R. Dunn, D. Lewis, L. Beck, *Fibrous Polymers for the Delivery of Contraceptive Steroids to the Female Reproductive Tract*, Controlled Release of Pesticides and Pharmaceuticals, 125–46 (D. Lewis Ed. 1981).

Primary Examiner—Jeanette Hunter
Attorney, Agent, or Firm—Willian, Brinks, Olds, Hofer, Gilson & Lione

[57] ABSTRACT

An improved method of encapsulating an active ingredient for use in chewing gum involves extruding a blend of polyvinyl acetate, an active ingredient and salt. The invention also includes an encapsulated active ingredient prepared according to the improved method, and a chewing gum which contains the encapsulated active ingredient of the invention.

48 Claims, No Drawings

USE OF SALT TO IMPROVE EXTRUSION ENCAPSULATION OF CHEWING GUM INGREDIENTS

This application is a continuation-in-part of U.S. application Ser. No. 07/782,006, filed Oct. 18, 1991, which in turn is a continuation-in-part of U.S. application Ser. No. 07/606,044, filed on Oct. 30, 1990, which in turn is a continuation-in-part of U.S. application Ser. No. 07/340,384, filed Apr. 19, 1989, now U.S. Pat. No. 4,978,537.

FIELD OF THE INVENTION

This invention involves an improved method of encapsulating sweetener, flavor, and flavor enhancing ingredients for use in chewing gum, using a combination of salt and polyvinyl acetate. The invention also includes encapsulated sweetener, flavor, and flavor enhancing ingredients prepared according to the improved method. The invention also includes chewing gum compositions which utilize the encapsulated sweetener, flavor, and flavor enhancing ingredients prepared according to the improved method.

BACKGROUND OF THE INVENTION

Chewing gums of the types typically known in the art contain many ingredients including flavor ingredients, sweetener ingredients and flavor-enhancing ingredients. It is often desirable to produce a chewing gum having a high degree of sweetness and flavor, which lasts for an extended period of time. "Fast release" chewing gums known in the art typically release their flavor and sweetness compounds rapidly, creating an initial burst of high intensity sweetness and flavor which is pleasing to the consumer but which does not last. "Slow-release" chewing gums, on the other hand, release their sweetness and flavor over a longer period of time but do not provide an initial burst of high intensity sweetness and flavor. Hence, chewing gum manufacturers are constantly trying to extend the time in which consumers can enjoy the sweetness and flavor of chewing gum without sacrificing the quality of the initial sweetness and flavor impact.

In order to control the release of the flavoring agents, and thus lengthen the duration of the flavor, various methods and systems for encapsulating flavoring agents in matrices have been developed. U.S. Pat. No. 4,978,537, issued to Song, discloses gradual release structures formed by meltspinning a mixture of an active agent and a wall material. Possible active agents include high intensity sweeteners such as aspartame, alitame, acesulfame-K and its salts. Possible active agents also include inorganic salts such as sodium chloride and potassium chloride, bases, breath fresheners, flavor modifiers, etc. The wall material is preferably a material which will stretch, deform or flatten under pressure including, for instance, polyvinyl acetate but not including high molecular weight polyvinyl acetate.

U.S. Pat. No. 2,290,120, issued to Thomas, discloses the mixing of particles of chewing gum base with the flavoring agent to provide a substantially homogeneous mixture. U.S. Pat. No. 2,596,852, issued to Heggie, discloses chemically reacting the chewing gum base with molecules of flavor ingredient, wherein the chewing gum base is a vinyl acetate polymer and the flavor molecule contains an ethylenic bond.

U.S. Pat. No. 2,886,446, issued to Kramer, discloses the coacervation of a typically volatile, water immiscible flavoring oil within a body of gelatin. U.S. Pat. No. 3,085,048, issued to Bush, discloses a process for coating dicalcium phosphate with sugar. U.S. Pat. No. 3,795,744, issued to Ogawa et al., discloses the coating, encapsulation or combination of flavoring agents with high molecular weight compounds including starches, cellulose, proteins, gums, polyvinyl alcohol and polyvinyl esters. U.S. Pat. No. 3,826,847, issued to Ogawa et al., contains a similar disclosure. U.S. Pat. No. 3,818,107, issued to Yolles, discloses flavoring agent appended to a polymer backbone, releasable upon hydrolysis.

U.S. Pat. No. 3,962,463, issued to Witzel, discloses the encapsulation of flavor ingredients in gelatin waxes, polyethylene and the like followed by the depositing of the encapsulated flavor particles on the surface of the chewing gum. U.S. Pat. No. 4,217,368, issued to Witzel et al., discloses the controlled release of a (second) sweetener which is dispersed in, enveloped by, trapped in and otherwise protected by the gum base. A first sweetener, which is relatively unprotected, provides an initial burst of flavor. U.S. Pat. No. 4,259,355, issued to Marmo et al., discloses a hydrolytically releasable flavor oil entrapped in gelatine, dextrin, gum acacia or modified food starch with the aid of a hydroxypropylcellulose solid suspending agent. A hydrophobic unconfined flavor oil provides an initial burst of flavor.

U.S. Pat. No. 4,230,687, issued to Sair et al., discloses the encapsulation of flavoring agent in a polymeric medium using rigorous and intimate conditions of mechanical shear to mix the flavoring agent with the encapsulating medium. The flavoring agent is gradually released from the encapsulating matrix at a rate dependent upon the rate of hydration of the matrix, which in turn depends upon the particular matrix used. The polymeric matrix may be derived from natural substances such as casein, a gelatin, modified starches, gums and related materials.

U.S. Pat. No. 4,590,075, issued to Wei et al., discloses a flavor and sweetener delivery system including a flavoring agent and/or sweetener encapsulated in an elastomeric matrix. The elastomeric matrix is substantially hydrophobic and includes elastomer, elastomer solvent, a wax system and an excipient. The excipient, which is present only in small amounts, can include carbohydrate materials (including partially hydrolyzed starch), polyhydric alcohols, and mixtures of carbohydrates and polyhydric alcohols.

Some encapsulation methods known in the art involve the use of polyvinyl acetate as a primary encapsulating material. U.S. Pat. Nos. 4,721,620 and 4,794,003 to Cherukuri et al., and U.S. Pat. No. 4,915,918 to Faust et al., disclose gum bases which contain mixtures of high molecular weight polyvinyl acetate and medium molecular weight polyvinyl acetate. In particular, the use of high molecular weight polyvinyl acetate offers a release profile which can delay the release of the encapsulated ingredient until later in the chew. However, problems have been encountered with the processing of polyvinyl acetate during the encapsulation process.

In particular, encapsulation of flavors and flavor enhancers into higher molecular weight polyvinyl acetate using common extrusion processes can cause it to plasticize. Build-up of the encapsulation mixture in the feed throat of the extruder occurs, resulting in lower throughput. Problems also occur during the cooling, grinding and sizing of the extrudate. The extrudate is extremely soft and pliable when cooled. This softness manifests itself as surface stickiness, which causes the extrudate to stick to itself.

SUMMARY OF THE INVENTION

It has been discovered by the inventors that when salt is combined with polyvinyl acetate, the foregoing problems associated with encapsulation of sweeteners, flavors and flavor enhancers can be alleviated. The addition of salt to the other ingredients of the encapsulation mixture prevents the encapsulation ingredients from blocking the feed throat, and results in a relatively hard and brittle encapsulation product. A higher throughput is achieved, and the extrudate handles better during grinding and sizing.

While the inventors do not wish to be bound to a particular theory of how the invention works, it is believed that ionic ingredients such as salt in the polyvinyl acetate can act as crosslinking agents in that ionic bonds form between the linear chains of polyvinyl acetate, forming a linked network of polymer chains. For instance, when sodium chloride is used as the salt, the negative charges of the acetate ions can combine with the positive charges to the sodium ions. At higher temperatures, during extrusion, the polyvinyl acetate remains sufficiently flexible, even in the presence of salt. When the polymer is cooled down, the ionic bonds become stronger and the encapsulation mixture becomes hard and brittle.

With the foregoing in mind, it is a feature and advantage of the invention to provide an improved method of encapsulating sweetener, flavor and flavor enhancing ingredients in polyvinyl acetate, wherein salt is employed as a reinforcing agent for the polyvinyl acetate.

It is particularly a feature and advantage of the invention to provide an improved method of extrusion encapsulation of sweetener, flavor and flavor enhancing ingredients in a polyvinyl acetate encapsulant which includes at least some high molecular weight polyvinyl acetate.

It is also a feature and advantage of the invention to provide improved encapsulated sweetener, flavor and flavor enhancing ingredients for use in chewing gum, which have been prepared by extrusion encapsulation using a combination of salt and polyvinyl acetate.

It is also a feature and advantage of the invention to provide a chewing gum which has been prepared using the improved encapsulated sweetener, flavor and/or flavor enhancing ingredients of the invention.

The foregoing and other features and advantages will become further apparent from the following detailed description of the presently preferred embodiments, when read in conjunction with the accompanying examples. It should be understood that the detailed description and examples are illustrative rather than limitative, the scope of the present invention being defined by the appended claims and equivalents thereof.

DETAILED DESCRIPTION OF THE PRESENTLY PREFERRED EMBODIMENTS

The present invention focuses primarily on improved extrusion encapsulation of sweetener, flavor and flavor enhancing ingredients with polyvinyl acetate and, especially, with high molecular weight polyvinyl acetate or mixtures of high and medium molecular weight polyvinyl acetate. In accordance with the invention, a quantity of polyvinyl acetate, preferably high molecular weight polyvinyl acetate, is first ground into powder or small particles. The term "high molecular weight polyvinyl acetate" is defined herein as polyvinyl acetate having an average molecular weight in excess of about 40,000. Most preferably the high molecular weight polyvinyl acetate will have an average molecular weight in excess of about 50,000. The grinding can be accomplished using a Mikropul hammermill grinder available from the Micron Powder Systems, Summit, N.J., equipped with a 0.75 inch round hole screen. Other suitable grinding equipment can alternatively be used.

The ground polyvinyl acetate is then dry-blended with powdered salt and an active ingredient using a ribbon blender or other suitable dry blending equipment. The salt is preferably an inorganic salt. Examples of suitable salts include, but are not limited to, sodium chloride, potassium chloride, ammonium chloride, salts of acesulfame, calcium carbonate, sodium carbonate, potassium carbonate, other food acceptable inorganic salts, and combinations thereof. The presently preferred salt is sodium chloride. Preferably, the salt is in the form of a fine powder.

The active ingredient can be a sweetener, a flavor ingredient, or a flavor enhancing ingredient. High intensity sweeteners are often at least 20 times sweeter than sucrose, and are encapsulated to promote their stability and to slow their release. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination. Other sweeteners may also be encapsulated.

Flavoring agents suitable for use with the invention include any chewing gum flavor. Such flavoring agents may include powders, essential oils, synthetic flavors or mixtures thereof including but not limited to oils and powders derived from plants and fruits such as citrus oils, fruit essences, fruit esters, peppermint oil, spearmint oil, other mint oils, clove oil, oil of wintergreen, anise, cocoa powder, flavor aldehydes and ketones, and combinations thereof.

Flavor enhancers are ingredients which improve and enhance the quality of flavoring agents. For the present invention, the preferred active ingredient is a flavor enhancer known as Magnasweet 135 available from McAndrews and Forbes of Camden, N.J. Magnasweet 135 is principally composed of a monoammoniated glycyrrhizin based sweetener. Other flavor enhancers suitable for use with the invention include, cocoa powder, monosodium glutamate, capsaicin, gluconodelta lactone, inulin, and combinations thereof.

The blend of polyvinyl acetate, salt and active agent should contain about 50 to about 85 weight percent polyvinyl acetate, about 0.5 to about 20 weight percent salt and abut 1 to about 50 weight percent active ingredient. Preferably, the blend contains about 65 to about 80 weight percent polyvinyl acetate, about 5 to about 15 weight percent salt and about 10 to about 25 weight percent active agent. Most preferably, the blend contains about 75 weight percent polyvinyl acetate, about 10 weight percent salt and about 15 weight percent active agent. The preferred concentrations may vary somewhat depending on the type of salt used and the type of active agent being encapsulated.

In a preferred embodiment, a small quantity of magnesium stearate is also included in the blend as a processing aid. Preferably, the quantity of magnesium stearate is about 0.50 weight percent of the blend. Small quantities of other miscellaneous ingredients, for example, antioxidants, may also be included without departing from the spirit and scope of the invention.

The dry blended ingredients are then fed to the extruder in which the extrusion encapsulation will occur. Any suitable feeding equipment can be used to feed the ingredients including, for example, a K-Tron gravimetric feeder. The extrusion encapsulation can be accomplished using a Leistritz twin screw extruder, Model 34-ZSE, with counterrotating screws. The ingredients are mixed inside the twin screw extruder under conditions of high shear at temperatures above the glass transition temperature of the polyvinyl acetate. Preferably, the maximum temperature achieved by the mixture in the extruder is about 100° C. Preferably, the average residence time of the ingredients inside the extruder is less than about 45 seconds. This mixing of the salt, active agent and molten polyvinyl acetate in the extruder, followed by subsequent cooling, results in the encapsulation of the active ingredient in the matrix of polyvinyl acetate and salt.

After leaving the extruder, the encapsulation blend is cooled, typically using water, at least until the polyvinyl acetate returns to its solid state. The encapsulation mixture is pelletized and/or ground into powder using standard pelletizing and grinding equipment. The encapsulation product is now ready to be added to a standard chewing gum formula.

The encapsulant product of the invention can be added to any chewing gum formula to give high intensity, high quality, long lasting flavor. In addition to flavoring agents, a chewing gum composition generally includes a water soluble bulk portion and a water insoluble chewing gum base portion. The water soluble portion dissipates over a period of time during chewing. The gum base portion is retained in the mouth throughout the chewing process.

The insoluble gum base generally includes elastomers, resins, fats, oils, waxes, softeners and inorganic fillers. The elastomers may include polyisobutylene, isobutylene-isoprene copolymer, styrene butadiene rubber and natural latexes such as chicle. The resins may include polyvinyl acetate and terpene resins. Low molecular weight polyvinyl acetate is a preferred resin. Fats and oils may include animal fats such as lard and tallow, vegetable oils such as soybean and cottonseed oils, hydrogenated and partially hydrogenated vegetable oils, and cocoa butter. Commonly used waxes include petroleum waxes such as paraffin and microcrystalline wax, natural waxes such as beeswax, candellia, carnauba and polyethylene wax. The present invention contemplates the use of any commercially acceptable chewing gum base.

The gum base typically also includes a filler component such as calcium carbonate, magnesium carbonate, talc, dicalcium phosphate and the like; softeners, including glycerol monostearate and glycerol triacetate; and optional ingredients such as antioxidants, colors and emulsifiers. The gum base constitutes between 5%-95% by weight of the chewing gum composition, more typically 10%-50% by weight of the chewing gum, and most commonly 20%-30% by weight of the chewing gum.

The water soluble portion of the chewing gum may include softeners, bulk sweeteners, high intensity sweeteners, flavoring agents and combinations thereof. Softeners are added to the chewing gum in order to optimize the chewability and mouth feel of the gum. The softeners, which are also known as plasticizers or plasticizing agents, generally constitute between about 0.5%-15% by weight of the chewing gum. The softeners may include glycerin, lecithin, and combinations thereof. Aqueous sweetener solutions such as those containing sorbitol, hydrogenated starch hydrolysates, corn syrup and combinations thereof, may also be used as softeners and binding agents in chewing gum.

Bulk sweeteners constitute between 5%-95% by weight of the chewing gum, more typically 20%-80% by weight of the chewing gum and most commonly 30%-60% by weight of the chewing gum. Bulk sweeteners may include both sugar and sugarless sweeteners and components. Sugar sweeteners may include saccharide containing components including but not limited to sucrose, dextrose, maltose, dextrin, dried invert sugar, fructose, levulose, galactose, corn syrup solids, and the like, alone or in combination. Sugarless sweeteners include components with sweetening characteristics but are devoid of the commonly known sugars. Sugarless sweeteners include but are not limited to sugar alcohols such as sorbitol, mannitol, xylitol, hydrogenated starch hydrolysates, maltitol, and the like, alone or in combination.

As previously stated, high intensity sweeteners may also be present and are commonly used with sugarless sweeteners. When used, high intensity sweeteners typically constitute between 0.001%-5% by weight of the chewing gum, preferably between 0.01%-1% by weight of the chewing gum. Typically, high intensity sweeteners are at least 20 times sweeter than sucrose. These may include but are not limited to sucralose, aspartame, salts of acesulfame, alitame, saccharin and its salts, cyclamic acid and its salts, glycyrrhizin, dihydrochalcones, thaumatin, monellin, and the like, alone or in combination.

Combinations of sugar and/or sugarless sweeteners may be used in chewing gum. The sweetener may also function in the chewing gum in whole or in part as a water soluble bulking agent. Additionally, the softener may also provide additional sweetness such as with aqueous sugar or alditol solutions.

The encapsulation product of the invention should generally be present in the chewing gum in an amount within the range of about 0.1%-15% by weight of the chewing gum, preferably between about 0.2%-5% by weight of the chewing gum, most preferably between about 0.5%-3% by weight of the chewing gum. The encapsulation product of the invention may be used alone or in combination with other sweeteners, flavors, and/or flavor enhancers. As previously indicated, flavoring agents may include powders, essential oils, synthetic flavors or mixtures thereof including but not limited to powders and oils derived from plants and fruits such as citrus oils, fruit essences, peppermint oil, spearmint oil, other mint oils, clove oil, oil of wintergreen, anise and the like. Artificial flavoring agents and components may also be used in or in conjunction with the encapsulation product of the invention. Natural and artificial flavoring agents may be combined in any sensorially acceptable fashion.

Optional ingredients such as colors, emulsifiers, pharmaceutical agents and additional flavoring agents may also be included in chewing gum.

Chewing gum is generally manufactured by sequentially adding the various chewing gum ingredients to any commercially available mixer known in the art. After the ingredients have been thoroughly mixed, the gum mass is discharged from the mixer and shaped into the desired form such as by rolling into sheets and cutting into sticks, extruding into chunks, or casting into pellets. Generally, the ingredients are mixed by first melting the gum base and adding it to the running mixer. The gum base may alternatively be melted in the mixer. Color and emulsifiers can be added at this time.

A softener such as glycerin can be added next along with syrup and part of the bulk portion. Further parts of the bulk portion may then be added to the mixer. The encapsulation product of the invention, and optional additional flavoring agents, are typically added with the final part of the bulk portion. The entire mixing process typically takes from five to fifteen minutes, although longer mixing times are sometimes required. Those skilled in the art will recognize that variations of this mixing procedure, or other mixing procedures, may be followed.

A wide range of changes and modifications to the embodiments of the invention described above will be apparent to persons skilled in the art. The following examples are not to be construed as imposing limitations on the invention, but are included merely to illustrate preferred embodiments.

EXAMPLE 1

74.63 pounds of polyvinyl acetate having an average molecular weight of 52,000, was ground into small particles using a Mikropul hammermill grinder equipped with a 0.75 inch round hole screen micropul. The ground polyvinyl acetate was then dry blended with 13.82 pounds of Magnasweet 135, 11.05 pounds of extra fine (325 mesh) sodium chloride, and 0.5 pounds of magnesium stearate, using a ribbon dry blender, for a time period of 15 minutes. The blend had the following composition:

| | |
|---|---|
| 74.63% | Polyvinyl acetate |
| 13.82% | Magnasweet 135 |
| 11.05% | NaCl |
| 0.50% | Magnesium stearate |

The dry blended ingredients were added to a Model 34-ZSE Leistritz twin screw extruder with counterrotating screws, using a K-Tron gravimetric feeder. The maximum extruder temperature was 100° C., and the average residence time in the extruder was less than 45 seconds. There was no blocking in the extruder feed throat, and a throughput of 50 to 60 pounds per hour was achieved. The temperature in the extruder feed throat was about 80° C. After extrusion, the encapsulation product was quenched using water and was ground into particles having a diameter range of 0.0165–0.0007 inches. The quenching and grinding went smoothly, and the particles did not stick to each other.

EXAMPLE 2

75 pounds of polyvinyl acetate having an average molecular weight of 52,000, was ground into small particles as in Example 1. The ground polyvinyl acetate was then dry blended with 25 pounds of Magnasweet 135, using a ribbon dry blender, for a time period of 15 minutes. The blend had the following composition:

| | |
|---|---|
| 75% | Polyvinyl acetate |
| 25% | Magnasweet 135 |

The dry blended ingredients were added to and mixed in the Leistritz twin screw extruder as in Example 1. However, due to partial blocking of the extruder feed throat, a throughput of only 40 pounds per hour was achieved. The encapsulation product was quenched and ground as in Example 1. This time, however, the extrudate remained soft and pliable, even after cooling. The encapsulation product had a tendency to stick to itself, both before and after grinding.

EXAMPLES 3-6

The following encapsulation product compositions are also deemed to be within the scope of the invention:

| Example 3 | Example 4 |
|---|---|
| 75% Polyvinyl acetate | 75% Polyvinyl acetate |
| 15% Aspartame | 15% Thaumatin |
| 10% Potassium chloride | 10% Acesulfame K |
| Example 5 | Example 6 |
| 75% Polyvinyl acetate | 75% Polyvinyl acetate |
| 15% Cocoa | 15% Citric acid |
| 10% Ammonium chloride | 10% Sodium carbonate |

EXAMPLES 7 and 8

The encapsulation products of Examples 1 and 2 were added into the following chewing gum formulae:

| Component | Example 7 (Weight %) | Example 8 (Weight %) |
|---|---|---|
| Sugar | 51.314 | 51.314 |
| Gum Base | 23.91 | 23.91 |
| Dextrose Monohydrate | 13.41 | 13.41 |
| Corn Syrup | 8.40 | 8.40 |
| Glycerine | 0.889 | 0.889 |
| Peppermint Flavor | 1.35 | 1.35 |
| Encapsulated MS135 (Example 1) | 0.727 | — |
| Encapsulated MS135 (Example 2) | — | 0.727 |

While the embodiments of the invention disclosed herein are presently considered to be preferred, various modifications and improvements can be made without departing from the spirit and scope of the invention. The scope of the invention is indicated in the appended claims, and all changes which are within the meaning and range of equivalency of the claims are intended to be embraced therein.

We claim:

1. A method of preparing an encapsulated active ingredient for use in chewing gum, comprising the steps of:
    preparing a blend comprising about 50 to about 85 weight percent polyvinyl acetate, about 0.5 to about 20 weight percent salt and about 1 to about 50 weight percent active ingredient;
    melting the polyvinyl acetate, and mixing the polyvinyl acetate, salt and active ingredient, in an extruder having a feed throat, to form an encapsulation product;

extruding the encapsulation product;
quenching the encapsulation product; and
grinding the encapsulation product;
whereby the inclusion of salt with the polyvinyl acetate and active ingredient alleviates blocking of the feed throat and results in a hard and brittle encapsulation product.

2. The method of claim 1, wherein the polyvinyl acetate comprises high molecular weight polyvinyl acetate.

3. The method of claim 2, wherein the high molecular weight polyvinyl acetate has an average molecular weight of at least about 40,000.

4. The method of claim 2, wherein the high molecular weight polyvinyl acetate has an average molecular weight of at least about 50,000.

5. The method of claim 1, wherein the blend comprises about 65 to about 80 weight percent polyvinyl acetate.

6. The method of claim 1, wherein the blend comprises about 75 weight percent polyvinyl acetate.

7. The method of claim 1, wherein the active ingredient comprises a sweetener.

8. The method of claim 7, wherein the sweetener comprises a high intensity sweetener.

9. The method of claim 1, wherein the active ingredient comprises a flavoring agent.

10. The method of claim 1, wherein the active ingredient comprises a flavor enhancing agent.

11. The method of claim 1, wherein the blend comprises about 10 to about 25 weight percent active ingredient.

12. The method of claim 1, wherein the blend comprises about 15 weight percent active ingredient.

13. The method of claim 1, wherein the salt comprises an inorganic salt.

14. The method of claim 13, wherein the inorganic salt is selected from the group consisting of sodium chloride, potassium chloride, ammonium chloride, salts of acesulfame K, calcium carbonate, sodium carbonate, potassium carbonate, other food acceptable inorganic salts, and combinations thereof.

15. The method of claim 1, wherein the salt comprises sodium chloride.

16. The method of claim 1, wherein the blend comprises about 5 to about 15 weight percent salt.

17. The method of claim 1, wherein the blend comprises about 10 weight percent salt.

18. The method of claim 1, wherein the polyvinyl acetate, salt and active ingredient are blended before being added to the extruder.

19. An encapsulated active ingredient prepared according to the method of claim 1.

20. A chewing gum comprising an encapsulated active ingredient prepared according to the method of claim 1.

21. A method of preparing an encapsulated active ingredient for use in chewing gum, comprising the steps of:
providing a quantity of polyvinyl acetate in particle form;
providing a quantity of active ingredient selected from the group consisting of sweeteners, flavoring agents, flavor enhancing agents and combinations thereof;
providing a quantity of salt in particle form; and
extruding a blend comprising about 50 to about 85 weight percent of the provided polyvinyl acetate, about 1 to about 50 weight percent of the provided active ingredient and about 0.5 to about 20 weight percent of the provided salt, in an extruder having a feed throat, to form an encapsulation product;
whereby the inclusion of salt with the polyvinyl acetate and active ingredient alleviates blocking of the feed throat and results in a hard and brittle encapsulation product.

22. The method of claim 21, wherein the polyvinyl acetate, salt and active ingredient are extruded using a twin screw extruder.

23. The method of claim 22, wherein the twin screw extruder comprises two counterrotating screws.

24. The method of claim 21, wherein the polyvinyl acetate comprises high molecular weight polyvinyl acetate.

25. The method of claim 21, wherein the active ingredient comprises a high intensity sweetener selected from the group consisting of sucralose, aspartame, salts of acesulfame, alitame, saccharin and its salts, glycyrrhizin, dihydrochalcones, thaumatin, monellin and combinations thereof.

26. The method of claim 21, wherein the active ingredient comprises a flavoring agent selected from the group consisting of powders, essential oils, synthetic flavors and combinations thereof.

27. The method of claim 21, wherein the active ingredient comprises a flavor enhancing agent selected from the group consisting of a monoammoniated glycyrrhizin-based sweetener, cocoa powder, monosodium glutamate, capsaicin, gluconodelta lactone, inulin, and combinations thereof.

28. The method of claim 27, wherein the flavor enhancing agent comprises Magnasweet 135.

29. The method of claim 21, wherein the salt comprises an inorganic salt selected form the group consisting of sodium chloride, potassium chloride, ammonium chloride, salts of acesulfame K, calcium carbonate, sodium carbonate, potassium carbonate, other food acceptable inorganic salts, and combinations thereof.

30. The method of claim 29, wherein the salt comprises sodium chloride.

31. An encapsulated active ingredient prepared according to the method of claim 21.

32. A chewing gum comprising an active ingredient prepared according to the method of claim 21.

33. An encapsulated active ingredient for use in chewing gum, comprising a mixed and extruded blend of:
about 50 to about 85 weight percent polyvinyl acetate;
about 1 to about 50 weight percent of an active ingredient selected from the group consisting of sweeteners, flavoring agents, flavor enhancing agents and combinations thereof; and
about 0.5 to about 20 weight percent of an inorganic salt;
mixed together and extruded in an extruder having a feed throat;
whereby the inclusion of salt with the polyvinyl acetate and active ingredient alleviates blocking of the feed throat and results in a hard and brittle encapsulated active ingredient.

34. The encapsulated active ingredient of claim 33, comprising:
about 65 to about 80 weight percent of the polyvinyl acetate;

about 10 to about 25 weight percent of the active ingredient; and about 5 to about 15 weight percent of the inorganic salt.

35. The encapsulated active ingredient of claim 33, comprising:
about 75 weight percent of the polyvinyl acetate;
about 15 weight percent of the active ingredient; and
about 10 weight percent of the inorganic salt.

36. The encapsulated active ingredient of claim 33, further comprising magnesium stearate.

37. The encapsulated active ingredient of claim 36 wherein the magnesium stearate is present in a quantity of about 0.5 weight percent.

38. The encapsulated active ingredient of claim 33 in a chewing gum.

39. A chewing gum comprising a water soluble bulk portion, a water insoluble base portion, and one or more flavoring agents, said chewing gum composition further comprising an extrusion encapsulated active ingredient including:
about 50 to about 85 weight percent polyvinyl acetate;
about 1 to about 50 weight percent of an active ingredient selected from the group consisting of sweeteners, flavoring agents, flavor enhancing agents and combinations thereof; and
about 0.5 to about 20 weight percent salt;
wherein the extrusion encapsulated active ingredient is prepared using an extruder having a feed throat; whereby the inclusion of salt with the polyvinyl acetate and active ingredient alleviates blocking of the feed throat and results in a hard and brittle extrusion encapsulated active ingredient.

40. The chewing gum of claim 39, wherein the extrusion encapsulated active ingredient is present in an amount of about 0.1 to about 15 weight percent of the chewing gum.

41. The chewing gum of claim 39, wherein the extrusion encapsulated active ingredient is present in an amount of about 0.2 to about 5 weight percent of the chewing gum.

42. The chewing gum of claim 39, wherein the extrusion encapsulated active ingredient is present in an amount of about 0.5 to about 3 weight percent of the chewing gum.

43. The chewing gum of claim 39, wherein the polyvinyl acetate comprises high molecular weight polyvinyl acetate.

44. The chewing gum of claim 39, wherein the active ingredient comprises a high intensity sweetener.

45. The chewing gum of claim 39, wherein the active ingredient comprises a flavoring agent.

46. The chewing gum of claim 39, wherein the active ingredient comprises a flavoring enhancing agent.

47. The chewing gum of claim 46, wherein the flavor enhancing agent comprises a monoammoniated glycyrrhizin based sweetener.

48. The chewing gum of claim 39, wherein the salt comprises sodium chloride.

* * * * *